United States Patent

Rainish et al.

Patent Number: 6,163,548
Date of Patent: Dec. 19, 2000

[54] CODE SYNCHRONIZATION UNIT AND METHOD

[75] Inventors: Doron Rainish, Ramat Gan; David Ben-Eli, Modiin; David Burshtein; Shlomo Shamai, both of Tel Aviv, all of Israel

[73] Assignee: D.S.P.C. Technologies Ltd., Giv'at Shmuel, Israel

[21] Appl. No.: 08/869,728

[22] Filed: Jun. 5, 1997

[30] Foreign Application Priority Data

Mar. 30, 1997 [IL] Israel ........................................ 120555

[51] Int. Cl.⁷ ...................................................... H04J 13/00
[52] U.S. Cl. ............................ 370/479; 370/335; 370/342; 375/130
[58] Field of Search .................................... 370/203, 205, 370/208, 209, 328, 329, 335, 342, 350, 479, 503; 375/200, 208, 130, 132, 135, 134

[56] References Cited

U.S. PATENT DOCUMENTS

| | | | |
|---|---|---|---|
| 5,056,109 | 10/1991 | Gilhousen et al. | 370/342 |
| 5,396,516 | 3/1995 | Padovani et al. | 375/225 |
| 5,440,597 | 8/1995 | Chung et al. . | |
| 5,463,657 | 10/1995 | Rice . | |
| 5,550,811 | 8/1996 | Kaku et al. . | |
| 5,577,025 | 11/1996 | Skinner et al. . | |
| 5,579,338 | 11/1996 | Kojima . | |
| 5,642,377 | 6/1997 | Chung et al. . | |

OTHER PUBLICATIONS

A.J. Viterbi et al., "CDMA Principles of Spread Spectrum Communiation", Addison–Wesley, 1995, sectin 3.4.3, pp. 58–59.

Mohammad H. Zarrabizadeh and Elvino S. Sousa, Analysis of a Differentially Coherent DS–SS Parallel Acquisition Receiver, IEEE Proceedings of the 45th Vehicular Technology Conference, vol. 2, 1995, pp. 271–275.

V.V. Losev and V.D. Dvornikov, "Determination of the Phase of a Pseudorandom Sequence from Its Segment Using Fast Transforms", Radio Engineering and Electronic Physics, vol. 26, No. 8, Aug. 1981, pp. 61–66.

Martin Cohn and Abraham Lempel, "On Fast M–Sequence Transforms", IEEE Transactions on Information Theory, 1977, pp. 135–137.

V.V. Losev and V.D. Dvornikov, "Recognition of Address Sequences Using Fast Transformations", Radio Engineering and Electronic Physics, vol. 28, No. 8, Aug. 1983, pp. 62–69.

Srdjan Z. Budisin, "Fast PN Sequence Correlation By Using PWT", IEEE Proceedings of the Mediterranean Electrotechnical Conference (MELECON), Lisbin, Portugal, Apr. 1989, pp. 513–515.

Yair Be'ery and Jakov Snyders, "Optimal Soft Decision Block Decoders Based on Fast Hadamard Transform", IEEE Transactions on Information Theory, vol. 32, 1986, pp. 355–364.

Douglas F. Elliott and K. Ramamohan Rao, *Fast Transforms, Algorithms, Analyses, Applications*, Academic Press, New York, 1982, pp. 301–322.

*Primary Examiner*—Ajit Patel
*Assistant Examiner*—Bob A. Phunkulh
*Attorney, Agent, or Firm*—Skjerven, Morrill, MacPherson, Franklin & Friel LLP

[57] ABSTRACT

A pilot acquisition unit for code division multiple access (CDMA) communication systems is provided which includes a fast Hadamard transform (FHT) unit and a pre-Hadamard processing unit. The FHT unit determines the quality, in accordance with a metric, of each of a set of possible pseudo-random number (PN) loadings and the pre-Hadamard processing unit generates a vector u per set of PN loadings. The vector u defines a quality metric of a received pilot signal with the set of possible PN loadings, the pre-Hadamard processing unit providing the vector u to the FHT unit.

25 Claims, 8 Drawing Sheets

CODE SYNCHRONIZATION UNIT AND METHOD

FIELD OF THE INVENTION

The present invention relates to digital communication systems generally and to a method and apparatus for acquisition of digital communication signals.

BACKGROUND OF THE INVENTION

Digital communication systems transmit and receive signals which have digital information therein. Typically, such signals include the data to be transmitted plus additional portions needed to ensure accurate communication, such as synchronization signals (to synchronize the receiver with the transmitter) and error correcting codes (to ensure that the received data has not been corrupted and to correct at least part of any corrupted data).

There are many types of digital communication systems. One common one is that of a spread spectrum system. A conventional direct sequence spread spectrum signal can be viewed as the result of mixing a narrowband information-bearing signal with an informationless wideband (and constant envelope) "spreading" signal. If $B_i$ and $B_p$ denote the bandwidths of the information-bearing signal and the spreading signal, respectively, then the "processing gain" available to the receiver is $G=B_i/B_p$. The receiver synchronizes the incoming signal to a locally generated version of the spreading signal and mixes the received signal with the locally generated spreading signal, thereby removing the spreading signal from the received signal and "collapsing" the signal to the "information bandwidth" $B_i$.

The spreading signal is typically a coded sequence of some kind, such as a pseudo-random code. The United States space program initially utilized a Type 1 Reed-Muller code for deep-space communications. In code division multiple access (CDMA) systems, the code is a variation of the Reed-Mullel codes.

In the IS-95 standard for CDMA systems, each user has an individual Walsh code and each base station has a pilot signal. The pilot signals of the base stations are based on a single pseudo-random code sequence but each pilot signal has a unique phase. When transmitting signals to a user, the pilot signal of the relevant base station is combined with the user's Walsh code to produce the spreading signal for that user.

Pseudo-random code sequences are generated by pseudo-random number (PN) generators, one of which, labeled 10, is shown in FIG. 1 to which reference is now made. PN generator 10 is formed of a shift register having a series of M flip-flops 12 concatenated together via summers 14, where M is typically 15. The value of the bit stored in the ith flip-flop is $a_{i,t}$ which, for simplicity is labeled $a_i$. The set of $a_i$ at any time t is the "loading" of the PN generator 10 at time t.

The output $c_t$ of PN generator 10 for each time t is the value of $a_0$ at time t, a bit of value 1 or 0. At the end of each cycle, the output $c_t$ is provided back into each summer 14 via a corresponding switch 16, thereby producing new values for the $a_i$ and a new value for $c_t$.

Switches 16, also known as taps, have predetermined states $h_k$ and are either closed ($h_k=1$) or open ($h_k=0$). The initial switch ho is always closed and provides the output $c_t$ directly to the M-1th flip-flop 12. The pseudo-random code sequence p[t] is composed of PN symbols, the duration of each of which is termed a "chip". Each symbol of the sequence is defined by:

$$p[t]=(-1)^{c_t} \qquad \text{Equation 1}$$

In order to synchronize the local version of the spreading signal with the original version, the transmitting unit additionally transmits the pilot signal, containing the code sequence. For simplicity, we assume that the transmitted signal is binary phase shift keying (BPSK) modulated.

The local unit then synchronizes its local code generator to the pilot signal after which, the local unit can despread the received information bearing signals. The pilot signal is also utilized to track variations in the transmission channel.

The received signal, after being down converted to a baseband signal and sampled at the output of a matched filter at a rate of one sample per chip is denoted by R[t] t= . . . ,-2,-1,0,1,2, . . . . The received signal consists of the pilot signal and the user data signals, both of which are transmitted by the transmitting unit, and interference terms caused by thermal noise and by signals transmitted by adjacent transmitting units.

For the purpose of acquiring the initial synchronization, only the pilot signal pilot[t] is of interest. For a BPSK signal, the pilot signal may be represented by:

$$pilot[t] = \sum_{l=1}^{F} \alpha_l p^0[t] e^{j(\omega_0 t + \phi_l)} \qquad \text{Equation 2}$$

where $p^0[t]$ is a PN sequence, $\alpha_l e^{j\phi_l}$ is the channel gain of the l-th signal reflection (called a "finger"), F denotes the number of fingers and $\omega_0$ denotes the residual frequency drift after baseband down-conversion. Now, consider only the most significant finger (the one with the largest $\alpha_l$) and denote it by $\alpha e^{j\phi}$. Also, denote the contribution of all other fingers, the user data signals and other interferences by n[t]. Then R[t] is represented by:

$$R[t]=\alpha p^0[t]e^{j(\omega_0 t+\phi)}+n[t] \qquad \text{Equation 3}$$

The acquisition problem is how to efficiently obtain the phase of the PN sequence (i.e. the current loading of the PN generator 10) given some measurement record R[t] t=1,2, . . . ,N.

Solutions to the acquisition problem are described in the book *CDMA: Principles of Spread Spectrum Communication*, by A. J. Viterbi, Addison-Wesley, 1995, in particular in section 3.4.3, pp. 58–59. The book is incorporated herein by reference.

The direct approach is to enumerate over all possible $2^M-1$ phases of the PN sequence (there are $2^M$ possible initial loadings, but the zero loading is illegal since it produces an all zero sequence) and select the one which is optimal with respect to some criterion. This approach is computationally and time intensive due to the large number of possible PN loadings.

A possible refinement of this approach, discussed in the book *CDMA: Principles of Spread Spectrum Communication*, is to obtain the phase by using a two-stage (dual-dwell) search procedure, where the first stage enumerates over all possible PN phases and passes only those phases with metric values that are above some pre-specified threshold to the second stage. In the second stage, each phase hypothesis is examined more thoroughly (i.e., using a more computationally intensive criterion) in order to decide whether it is the true PN phase or not. The dual-dwell procedure is faster than the direct approach but still takes a significant amount of time.

When there is no frequency drift in the received samples R[t] (i.e., $\omega_0=0$), the optimal metric, under a white Gaussian noise assumption, whose absolute value needs to be maximized is a Maximum Likelihood metric, as follows:

$$\text{metric} = \sum_{l=1}^{N} R[t]p(t) \qquad \text{Equation 4}$$

where R[1],R[2], ... ,R[N] is the block of sampled data, sampled at the rate of one sample per chip, and p[t] is one possible PN sequence. In the dual dwell procedure, the size N of the block is relatively small in the first phase and larger in the second phase.

If the data might have a frequency drift, the metric should be insensitive to frequency drifts. The following differential metric has been suggested by M. H. Zarrabizadeh and E. S. Souza in the article "Analysis of a Differentially Coherent DS-SS Parallel Acquisition Receiver", *IEEE Proceedings of the 45th Vehicular Technology Conference*, Vol. 2, pp. 271–275, 1995 (the article is incorporated herein by reference):

$$\text{metric} = \sum_{l=1}^{N_s} z[l]z[l-1] \qquad \text{Equation 5}$$

where $$z[l] = \sum_{t=1}^{N_c} R[lN_c + t]p[lN_c + t]$$

$N_c$ is the number of chips used for the coherent summation (e.g. the number of chips per symbol which is 64 in the IS-95 CDMA standard), and $N_s$ is the number of z[ ] variables used for creating the final metric. For example, $N_s$ is small (e.g. 5) for the first phase (dwell) and larger (e.g. 10) for the second phase.

The following articles and patents discuss transform domain methods for soft decoding of PN loadings and error correcting codes in general when BPSK signaling is used. The articles are incorporated herein by reference.

V. V. Losev and V. D. Dvornikov, "Determination of the Phase of a Pseudorandom Sequence From its Segment Using Fast Transforms", *Radio Engineering and Electronic Physics*, Vol. 26, No. 8, pp. 61–66, August 1981;

M. Cohn and A. Lempel, "On Fast M-Sequence Transforms", *IEEE Transactions on Information Theory*, pp. 135–137, 1977;

V. V. Losev and V. D. Dvornikov, "Recognition of Address Sequences Using Fast Transformations", *Radio Engineering and Electronic Physics*, Vol. 28, No. 8, pp. 62–69, August 1983;

S. Z. Budisin, "Fast PN Sequence Correlation by Using FWT", *IEEE Proceedings of the Mediterranean Electrotechnical Conference(MELECON)*, Lisbon, Portugal, April 1989, pp. 513–515;

Y. Be'ery and J. Snyders, "Optimal Soft Decision Block Decoders Based on Fast Hadamard Transform", *IEEE Transactions on Information Theory*, Vol. 32,1986, pp. 355–364; and U.S. Pat. No. 5,463,657 to Rice.

SUMMARY OF THE PRESENT INVENTION

It is an object of the present invention to provide a novel and relatively fast method and apparatus for synchronization to a pilot signal, particularly for CDMA systems.

It is a further object of the present invention to provide a method and apparatus for synchronization to a pilot signal which has a frequency drift therein.

It is a still further object of the present invention to provide a method and apparatus for soft decoding an error correcting code when frequency drift is present.

There is therefore provided, in accordance with a preferred embodiment of the present invention, a pilot acquisition unit for code division multiple access (CDMA) communication systems which includes a fast Hadamard transform (FHT) unit and a pre-Hadamard processing unit. The FHT unit determines the quality, in accordance with a metric, of each of a set of possible pseudo-random number (PN) loadings and the pre-Hadamard processing unit generates a vector u per set of PN loadings. The vector u defines a quality metric of a received pilot signal with the set of possible PN loadings, the pre-Hadamard processing unit providing the vector u to the FHT unit.

Moreover, in accordance with a preferred embodiment of the present invention, the unit includes a partial possible PN loading generator for generating a series of partial possible PN loadings $s^E$, wherein each partial possible PN loading $s^E$ defines one set of possible PN loadings.

Further, in accordance with a preferred embodiment of the present invention, the unit includes a dual dwell unit for selecting the PN loadings having the metric values above a predetermined threshold from among the PN loadings selected by the local PN loading selector, for determining a second metric for each of the selected PN loadings and for selecting the PN loading from among the selected PN loadings with the best value for the second metric.

Additionally, in accordance with a preferred embodiment of the present invention, the pre-Hadamard processing unit comprises a local PN generator and a u vector generator which performs the following steps:

loads a local PN generator with an initial PN loading;

loops on each of the datapoints of the received pilot signal and per loop:

combines one partial possible loading $s_E$ with a datapoint of the received pilot signal and with a PN loading produced by the local PN generator thereby to update the u vector;

steps the local PN generator to produce another PN loading; and provides the resultant u vector to the FHT unit.

Alternatively, for received signals with frequency drift therein, the pre-Hadamard processing unit comprises a local PN generator and a u vector generator which performs a similar set of steps as follows:

loops over plurality of drift loop values, the step of looping including the steps of a) loading a local PN generator with a different initial PN loading per loop value and b) generating an input signal which is insensitive to drift from the received pilot signal;

loops on each of the datapoints of the input signal, the second step of looping including the steps of a) combining one partial possible loading $s^E$ with a datapoint of the input signal and with a PN loading produced by the local PN generator thereby to update the u vector and b) stepping the local PN generator to produce another PN loading.

The remaining steps are the same as for the non-frequency drift case.

Still further, in accordance with a preferred embodiment of the present invention, the unit can include a dual dwell unit which performs a further metric calculation on those PN loadings which produce a metric above a predefined threshold.

The present invention is operative for all digital communication systems (not just CDMA) which have frequency drifts therein and can also be implemented, as described and claimed hereinbelow, for signals encoded with error correcting codes. For the latter, the local PN generator is replaced with a generating matrix.

BRIEF DESCRIPTION OF THE DRAWINGS AND APPENDICES

The present invention will be understood and appreciated more fully from the following detailed description taken in conjunction with the drawings in which.

Figure 2:
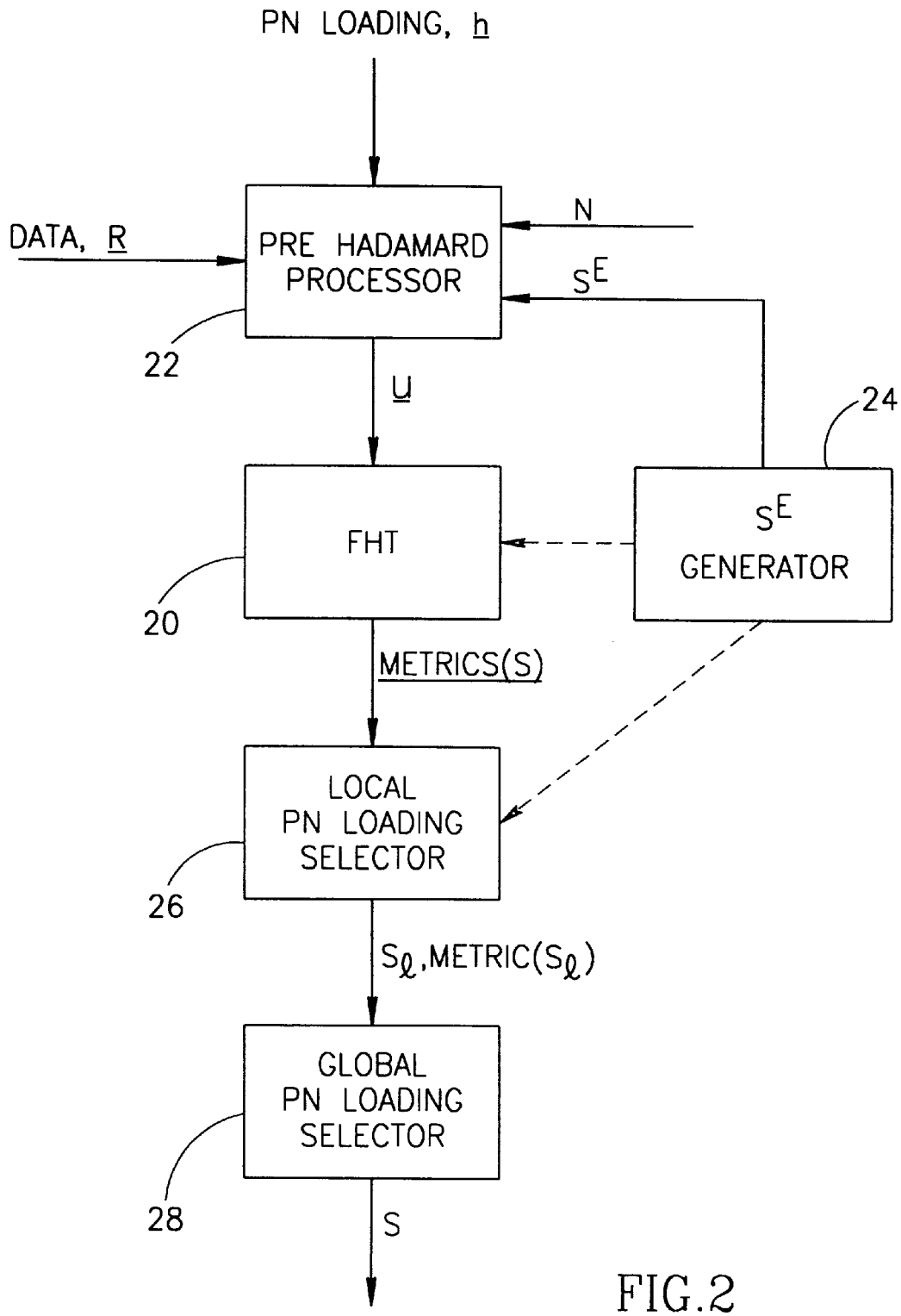
FIG. 2 is a block diagram illustration of a pilot acquisition unit, constructed and operative in accordance with a preferred embodiment of the present invention.
Figure 3:
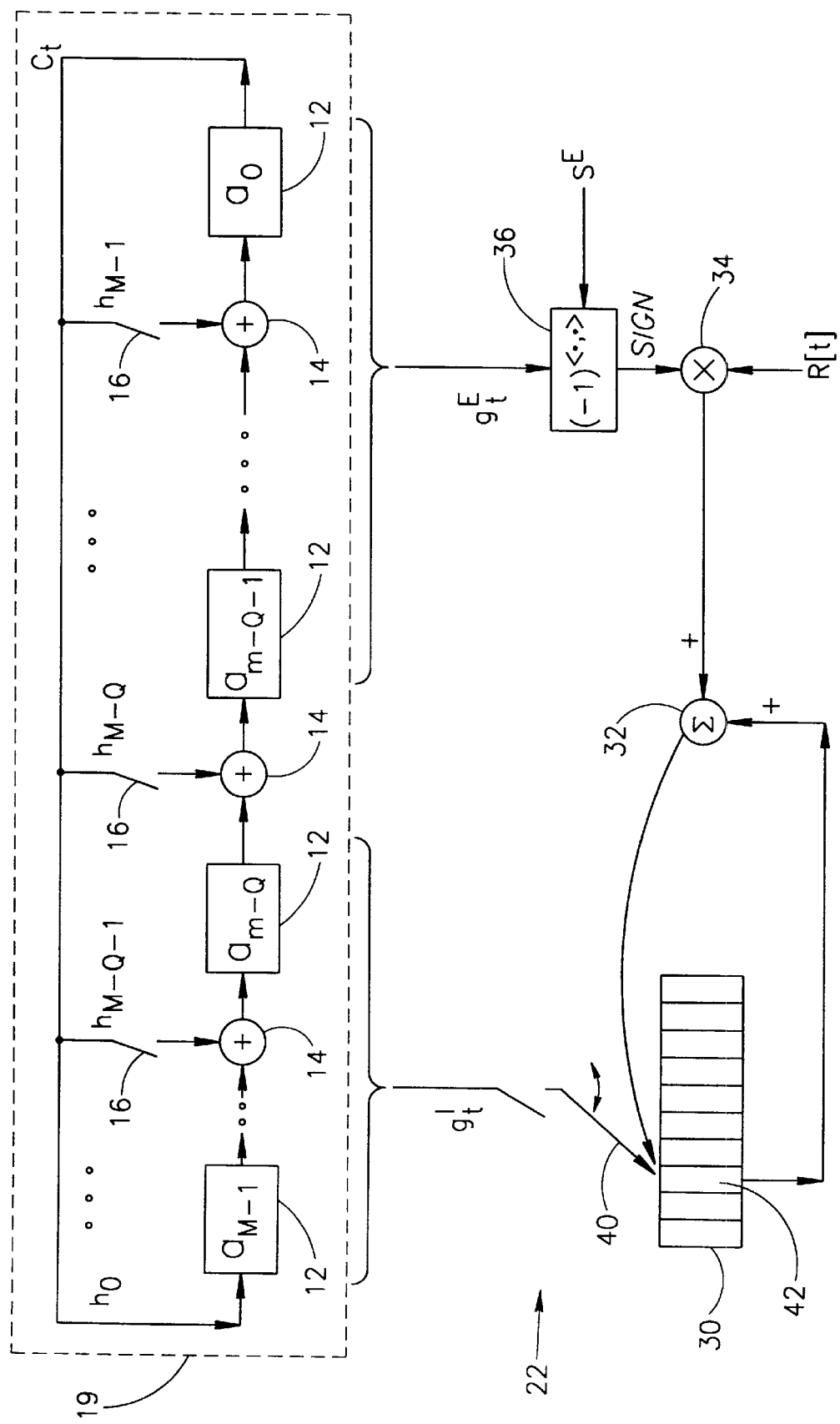
FIG. 3 is a schematic illustration of a pre-Hadamard processor forming part of the pilot acquisition unit of FIG. 2.
Figure 4:
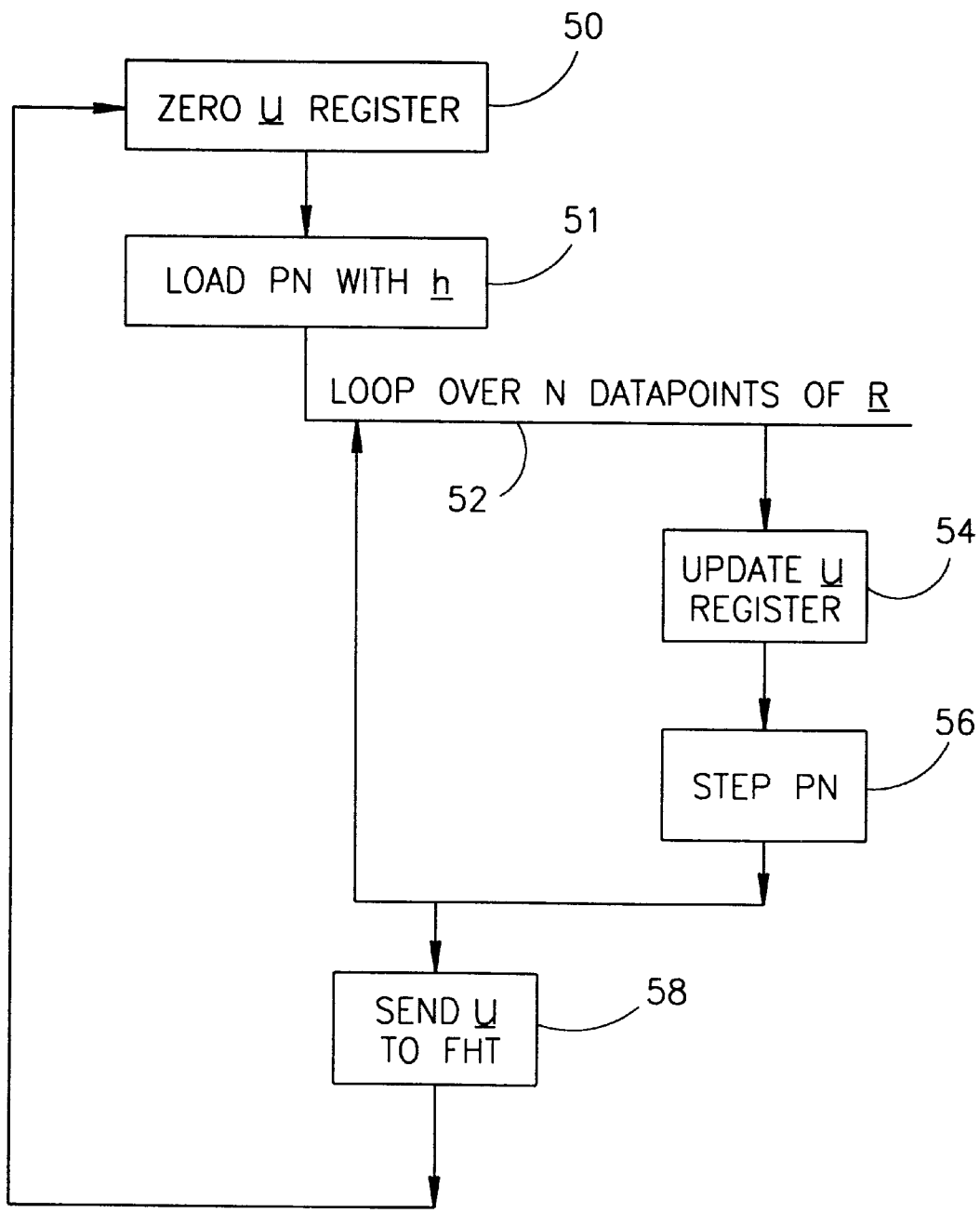
FIG. 4 is a flow chart illustration of a method of operating the pre-Hadamard processor of FIG. 3 for signals with no frequency drift.
Figure 5:
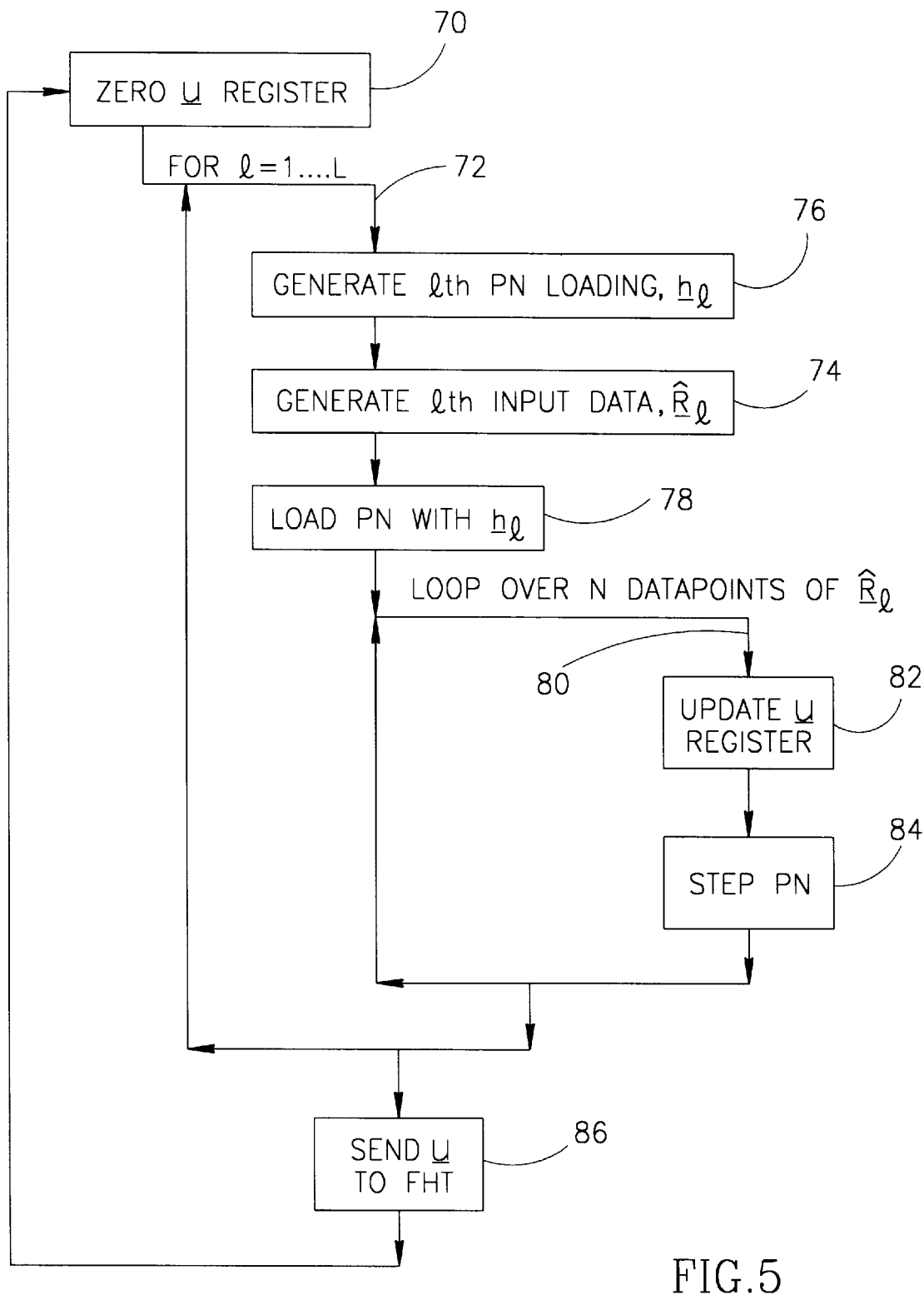
FIG. 5 is a flow chart illustration of a method of operating the pre-Hadamard processor of FIG. 3 for signals with frequency drift.

Appendix A provides the mathematical basis for the pre-Hadamard processor of FIGS. 2, 3 and 4 operating on quaternary phase shift keying (QPSK) signals having no frequency drift;

Appendix B provides the mathematical basis for the pre-Hadamard processor of FIG. 5 operating on QPSK signals having an unknown frequency drift.

Appendix C provides the mathematical basis for the pre-Hadamard processor of FIGS. 2, 3 and 4 operating on binary phase shift keying (BPSK) signals having no frequency drift; and Appendix D provides the mathematical basis for the pre-Hadamard processor of FIG. 5 operating on BPSK signals having an unknown frequency drift.

DETAILED DESCRIPTION OF PREFERRED EMBODIMENTS

The pilot acquisition unit of the present invention considers each possible pseudo random number (PN) loading s (i.e. set of flip-flop values $a_i$) and determines the value of a metric, metric[s] for it. The present invention then reviews the set of metrics[s] and selects the PN loading which is associated with the "best" (e.g. largest in absolute value) metric[s]. The selected PN loading is the detected current PN loading of a PN generator on the transmitting unit with which the data was encoded.

For CDMA systems which have quaternary phase shift keying (QPSK) signals, the transmitted signals are complex and thus, the PN sequence is also complex:

$$p^0[t] = p_I^0[t] + jp_Q^0[t].$$

The complex PN sequence is generated by two PN generators, one for the in-phase sequence $p_I^0[t]$ and one for the quaternary sequence $P_Q^0[t]$. For such CDMA systems, the metric for obtaining $p_I^0[t]$ might be:

$$metric[s] = \sum_{t=1}^{N} R[t]p_I[t] = \sum_{t=1}^{N} R[t](-1)^{c_t} \qquad \text{Equation 6}$$

where $c_t$ is the output of the in-phase PN generator and $p_I[t]$ is the in-phase portion of the complex QPSK PN sequence and is a function of the in-phase PN loading s. As discussed hereinbelow, $p_Q^0[t]$ is obtained from the estimated in-phase PN loading s.

It will be appreciated that metric[s] of Equation 6 given above is valid only if there is no frequency drift in the received data R[t].

It will further be appreciated that, while the present invention is described with respect to CDMA QPSK signals, it is also operative with respect to other digital communication systems.

The values of row vector metrics[s] (one element for each possible value of s) are generated via a fast Hadamard transform (FHT) by noting that metrics[s] an be written as follows:

$$\text{metrics}[s] = u \cdot H_m \qquad \text{Equation 7}$$

where $H_m$ is the Hadamard matrix and u is the input vector to the fast Hadamard transform. The association of metrics [s] with the Hadamard matrix and the construction of the input vector u from the received samples are derived in detail in Appendix A for a CDMA, QPSK input pilot signal. Fast Hadamard transforms are discussed in the book *Fast Transforms, Algorithms, Analysis, Applications*, by D. F. Elliot and K. R. Rao, Academic Press, New York, 1982. The book is incorporated herein by reference.

Reference is now made to FIG. 2 which illustrates, in block diagram format, the pilot acquisition unit of the present invention, to FIG. 3 which details a pre-Hadamard processor useful in the pilot acquisition unit of FIG. 2 and to FIG. 4 which illustrates, in flow-chart format, the method of operating the pre-Hadamard processor of FIG. 3.

The acquisition unit comprises a fast Hadamard transform (FHT) unit 20, a pre-Hadamard processor 22, a partial, possible PN loading $s^E$ generator 24, a local PN loading selector 26 and a global PN loading selector 28. Partial, possible PN loading $s^E$ generator 24 is typically a counter which provides the count value as the partial PN loading $s^E$.

As described in more detail hereinbelow, pre-Hadamard processor 22 produces the Hadamard input vector u for all of the loadings s which have the current partial, possible loading $s^E$ in common, given the received data R[t] and an initial loading h of a PN generator 19 (FIG. 3) forming part of pre-Hadamard processor 22. Initial loading h, defined as $(h_{m-1}, \ldots h_0)$, is produced by providing the values of the taps 16 into their corresponding flip-flops 12, where $a_0$ receives the value of $h_{m-1}$ etc.

FHT unit 20 performs a fast Hadamard transform on the Hadamard input signal u and produces therefrom the vector metrics[s] for all of the loadings s which have the current partial, possible loading $s^E$ in common. Local PN loading selector 26 selects the PN loading $s_l$ associated with the maximal component of |metrics[s]|. The process is repeated for all partial, possible loadings $s^E$ and global PN loading selector 28 selects the detected PN loading s from among those loadings $s_l$ produced by local PN loading selector with the largest value of |metric[s]|.

IS-95 CDMA systems have two local PN generators, an in-phase PN generator and a quaternary PN generator, which are tied to each other and the in-phase PN generator influences the sequence of the quaternary PN generator. The opposite is not true. To synchronize both local PN generators with the transmitting PN generators, the local PN generators are initialized with their initial loadings and are stepped together until the in-phase PN generator achieves the selected loading S. The quaternary PN generator will have achieved its appropriate loading.

Figure 1:
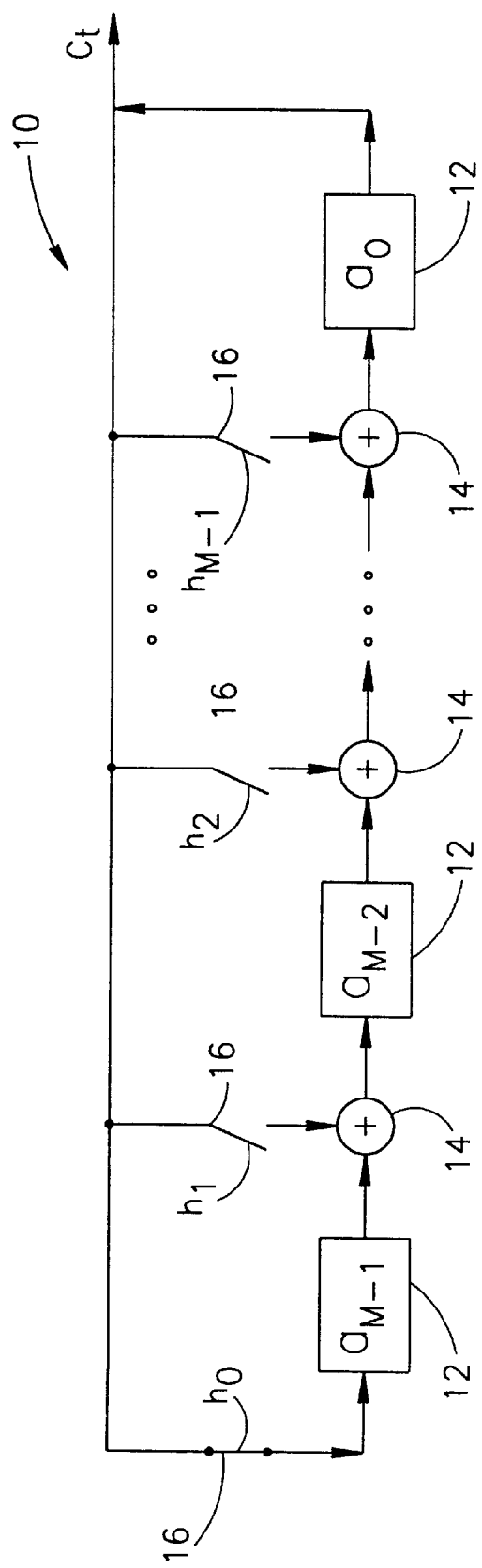
FIG. 1 is schematic illustration of a prior art pseudo-random number (PN) generator.

As shown in FIG. 3, pre-Hadamard processor 22 comprises a local pseudo-random number generator 19, similar to PN generator 10 of FIG. 1, a Hadamard vector u register 30, a summer 32, a scalar multiplier 34 and a XOR-AND unit 36.

In accordance with the article by Be'ery and Snyders discussed herein in the Background and as detailed in Appendix A, PN generator 19 is divided into two sections, an external section E of length m-Q incorporating the m-Q flip-flops 12 having values $a_0$ to $a_{m-Q-1}$ and an internal section l of length Q incorporating the Q flip-flops 12 having values $a_{m-Q}$ to $a_{m-1}$. The internal section creates an internal vector $g_t^I$ and the external section creates an external vector $g_t^E$ where the vectors g are defined by:

$$g_t^I = (a_{m-1} \ldots a_{m-Q})$$

$$g_t^E = (a_{m-Q-1} \ldots a_0)$$

Equation 8 and the $a_i$ are the values in the flip-flops 12 at time t.

It will be appreciated that the vector $g_t = (g_t^I, g_t^E)$ is one possible state of the local PN generator 19 while PN loading s is the PN loading with which the received pilot signal was generated. Furthermore, it will be appreciated that the output $c_t$ of the PN generator 19 is a function of the PN loadings s and $g_t$ as follows:

$$c_t = <s, g_t>$$

Equation 9 where <,> denotes a XOR-AND operation and where XOR is denoted by $\oplus$:

$$<x,y> = (x_0 \text{ AND } y_0) \oplus (x_1 \text{ AND } y_1) \oplus \ldots \oplus (x_{n-1} \text{ AND } y_{n-1})$$

The value of internal vector $g_t^I$ defines an address within register 30, where register 30 contains $2^Q$ memory cells. Arrow 40 which points from internal vector $g_t^I$ to the address it defines, labeled 42. Pre-Hadamard processor 22 removes the value stored in address 42 and provides the value to summer 32.

The external vector $g_t^E$ is utilized, in combination with the possible, partial PN loading $s^E$, to determine the sign of the datapoint R[t]. It is noted that a) the partial PN loading $s^E$ is of the same length m-Q as the external vector $g_t^E$ and b) the external vector $g_t^E$ and the partial PN loading $s^E$ are binary vectors of 1's and 0's. Specifically, the operation performed is:

$$sign = (-1)^{\langle s^E, g_t^E \rangle}$$

Equation 10

Scalar multiplier 34 multiplies the datapoint R[t] by the value of sign and the result is added, in summer 32, to the component of the Hadamard input vector u removed from address 42. The output of summer 32 is then inserted back into address 42.

As indicated in FIG. 4, pre-Hadamard processor 22 repeats the above-described operations for each of the N values of R[t]. Initially (steps 50 and 51), pre-Hadamard processor 22 zeros the Hadamard vector u register 30 and loads the PN generator 19 with its initial state vector h. In step 52, pre-Hadamard processor 22 loops over the N values of R[t] where, for each value of R[t], the new value for the relevant component of u is determined (step 54) after which the PN generator 19 is stepped (step 56) to produce new values for internal vector $g_t^I$ and external vector $g_t^E$.

Once loop 52 has completed, the u vector has been produced and, therefore, can be sent (step 58) to FHT unit 20 for determining the values of metrics[s]. The process begins again at step 50 by resetting the Hadamard vector u and PN generator 19 to their initial states.

It will be appreciated that FHT unit 20 operates once per partial PN loading $s^E$ while pre-Hadamard processor 22 repeats its operations N times per partial PN loading $s^E$. The number of partial PN loadings $s^E$ is $2_{m-Q}$ where Q is chosen to balance between the number of operations performed by pre-Hadamard processor 22 and the number of operations performed by FHT unit 20.

It will further be appreciated that the fast Hadamard transform performed by FHT unit 20 performs a series of addition operations only. As a result, the pilot acquisition unit of the present invention performs addition operations only (there are no real number multiplications since XOR-AND unit 36 performs only XOR-AND operations and scalar multiplier 34 only produces a sign change). Since the number of addition operations is relatively low, the pilot acquisition unit of the present invention performs the pilot synchronization operation faster than in the prior art. Just how much faster depends on the selection of Q.

For example, there might be N=640 samples in the received signal R[t], the length m of the PN generators might be 15, and the split value Q might be 12.

The relatively fast acquisition is particularly useful for CDMA systems, such as for cellular telephony, where initial synchronization needs to be acquired as quickly as possible.

It will be appreciated that the equation for metric[s] given above in Equation 6 is valid only if there is no frequency drift in the received data R[t]. However, this is rarely the case. As discussed in Appendix B, the baseband down-conversion process is not ideal and some residual frequency drift will always be present (typically due to clock rate mismatch between the transmitter and receiver).

One possible solution is to enumerate over all possible frequency drifts and to eliminate the drift from the received data for each such hypothesis. Then the method that was presented above may be applied on the transformed data. Another possibility is to utilize a metric which is insensitive to the frequency drift. One such metric is a multi-differential metric, provided hereinbelow for QPSK signals (the metric for BPSK signals is provided in Appendix D):

$$metric[s] = \sum_{l=1}^{L} \sum_{t=1}^{N} \hat{R}_l[t] p_l^t[t]$$

Equation 11 where $$\hat{R}_l[t] = Re\{R[t]R^*[t-l]\}$$

and the number L of differentials is a small, predetermined number. For simplicity, L is less than or equal to m but other values are possible.

As derived in Appendix B, the multi-differential metric is determined in a manner similar to that of the non-frequency drift metric and thus, the pilot acquisition unit of FIG. 2 can be utilized to determine the PN loading associated with the best multi-differential metric. However, for this, multi-differential embodiment, the pre-Hadamard processor 22 of FIG. 2 is operated in accordance with FIG. 5, to which reference is now made.

Similar to FIG. 4, FIG. 5 illustrates the operations of pre-Hadamard processor 22 per partial PN loading $s^E$. Initially (step 70), pre-Hadamard processor 22 zeros the Hadamard vector u register 30. Following the preparation of register 30, pre-Hadamard processor 22 begins a loop 72 over the possible values of l. For each value of l, pre-Hadamard processor 22 generates (step 74) the l-th input data loading $\hat{R}_l$ as per Equation 11. Pre-Hadamard processor 22 also generates (step 76) the l-th loading $h_l$ of PN generator 19 and loads it (step 78) into PN generator 19. The l-th loading $h_l$ is defined by:

$$h_l = h \oplus z_l \qquad \text{Equation 12}$$

$$z_l = \left( \underbrace{0 \ldots 0}_{l-1} \; 1 \; \underbrace{0 \ldots 0}_{m-1} \right)$$

where h is the initial loading of PN generator 19 and $\oplus$ indicates the XOR operation.

Pre-Hadamard processor 22 then determines the values of u register 30 in loop 80 as in the previous embodiment with the following exceptions:

i) PN generator 19 is loaded with its l-th loading $h_l$ rather than h; and ii) the input data sequence $\hat{R}_l$ replaces the previous input data sequence R.

Specifically, u register 30 is updated (step 82) after which the PN generator 19 is stepped.

After both loops 72 and 80 are finished, the vector u stored in register 30 is provided (step 86) to FHT unit 20. The remaining operations of the pilot acquisition unit are as before. Pre-Hadamard processor 22 repeats its operations per partial loading $s^E$, local selector 26 selects the best solution $s_l$ per partial loading $s^E$, and global selector 28 selects the best overall loading S.

For example, there might be N=2560 samples in the received signal R[t], the length m of the PN generators might be 15, the split value Q might be 12 and the number of differentials L might be 8.

It will be appreciated that the pilot acquisition unit of the present invention can be utilized for systems with and without frequency drift, the only difference being the initial loading of the PN generator and the differential or non-differential input data. It is noted that all digital communication systems using PN generated codes, such as CDMA systems, other spread spectrum systems and systems which add error correcting codes to transmitted data, regardless of the format (QPSK, BPSK, etc.) of the transmitted data, typically have some frequency drift therein and thus, the second embodiment of FIG. 5 is typically applicable.

The pilot acquisition unit of the present invention can be operated within a dual dwell scheme, as follows. At the first stage (dwell), the unit of FIG. 2 detects all PN loadings which produce a metric value (with or without frequency drift) above some pre-selected threshold. At the second dwell, a further unit (not shown) calculates the prior art metric defined either by Equation 4 (no frequency drift) or by Equation 5 (with frequency drift), where, in both, the signal p[t] is replaced by the signal p*[t] in order to deal with a QPSK signal.

The threshold is determined as follows. Let the a-posteriori variance of the metric (given the data measurements) under a random loading be denoted by $\sigma^2$ (each metric has its own value of $\sigma^2$) At each dwell, only the hypotheses that are above $t \cdot \sigma$ (i.e. $|\text{metric}(s)| > t \cdot \sigma$) are passed on to the next stage (either the hypothesis is passed on to the second dwell or it is selected as a successful synchronization). For example, in a frequency drift situation, t might be set as t=4.0 for the first dwell (using the metric of Equation 11) and t=5.5 for the second dwell (using the metric of Equation 5).

Note that the a-posteriori variances of the various metrics are given by:

$$\sigma^2 = 2 \sum_{t=1}^{N} \|R[t]\|^2 \text{ for the metric defined by Equation 4}$$

$$\sigma^2 = 4 \sum_{l=1}^{N_s} \left( \sum_{t=1}^{N_c} \|R[lN_c + t]\|^2 \sum_{t=1}^{N_c} \|R[(l-1)N_c + t]\|^2 \right)$$

$$\sigma^2 = \sum_{t=1}^{N} \|R[t]\|^2 \text{ for the metric defined by Equation 6}$$

$$\sigma^2 = \sum_{l=1}^{L} \sum_{t=1}^{N} \left\| \hat{R}_l[t] \right\|^2 \text{ for the metric defined by Equation 11}$$

As mentioned hereinabove, the IS-95 specification for CDMA defines a complex PN loading, $$p^0[t] = p_I^0[t] + j p_Q^0[t],$$

which is generated by two PN generators. The first PN generator generates $$p_I^0[t].$$

The second PN generator generates $$p_Q^0[t]$$

Both PN generators are initialized at the beginning of the transmission.

In order to increase the periods of the PN sequences from $2^{15}-1$ to $2^{15}$, and to balance the number of 0's and 1's in these sequences, the following non-linear mechanism is employed. Whenever the pattern 0,0,0,0,0,0,0,0,0,0,0,0,0, 0,1 is detected in the first sequence, an additional 0 bit is inserted into the output of both sequences. However, the present invention does not collapse in the presence of the non-linearity but, instead, is degraded slightly.

It will be appreciated that the present invention is not limited by what has been described hereinabove and that numerous modifications, all of which fall within the scope of the present invention, exist. For example, while the present invention has been described with respect to CDMA systems, it can be implemented in other digital communication systems. In particular, the present invention incorporates all implementations of code synchronization in the presence of frequency drifts, whether in conjunction with a pilot signal or not.

Figure 6:
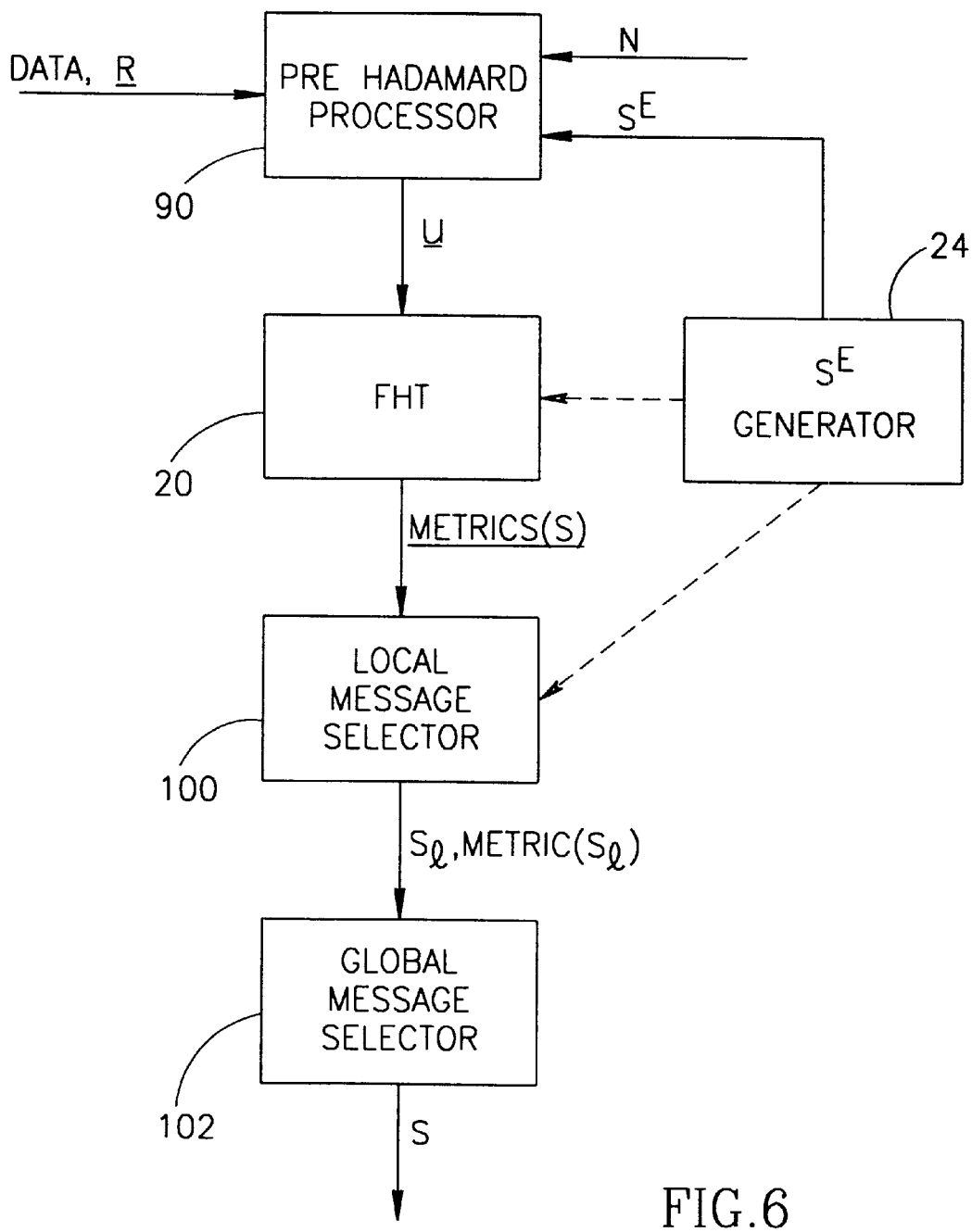
FIG. 6 is a block diagram illustration of a decoder for data encoding with error correction codes, constructed and operative in accordance with a further preferred embodiment of the present invention.
Figure 7:
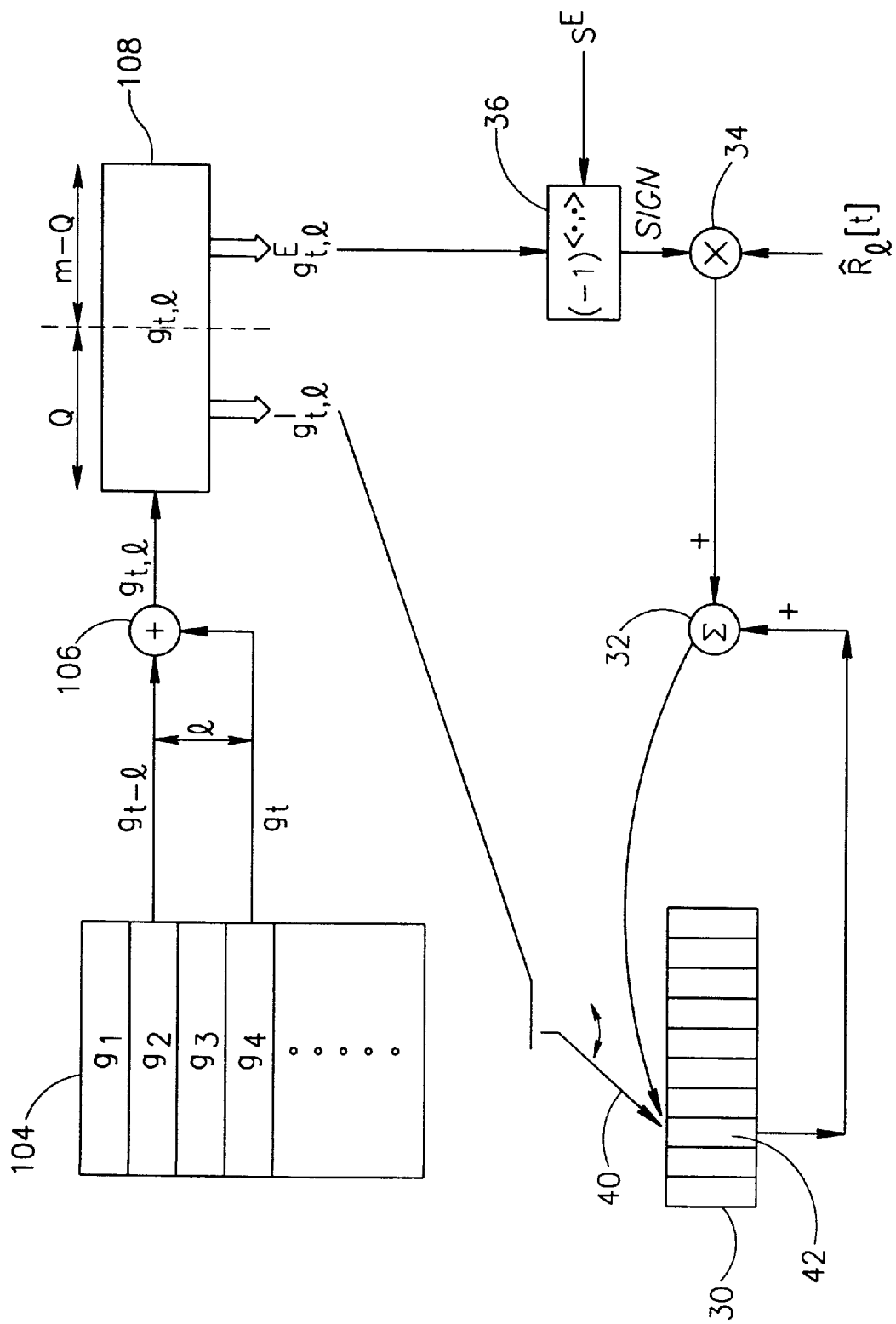
FIG. 7 is a schematic illustration of a pre-Hadamard processor forming part of the unit of FIG. 6.
Figure 8:
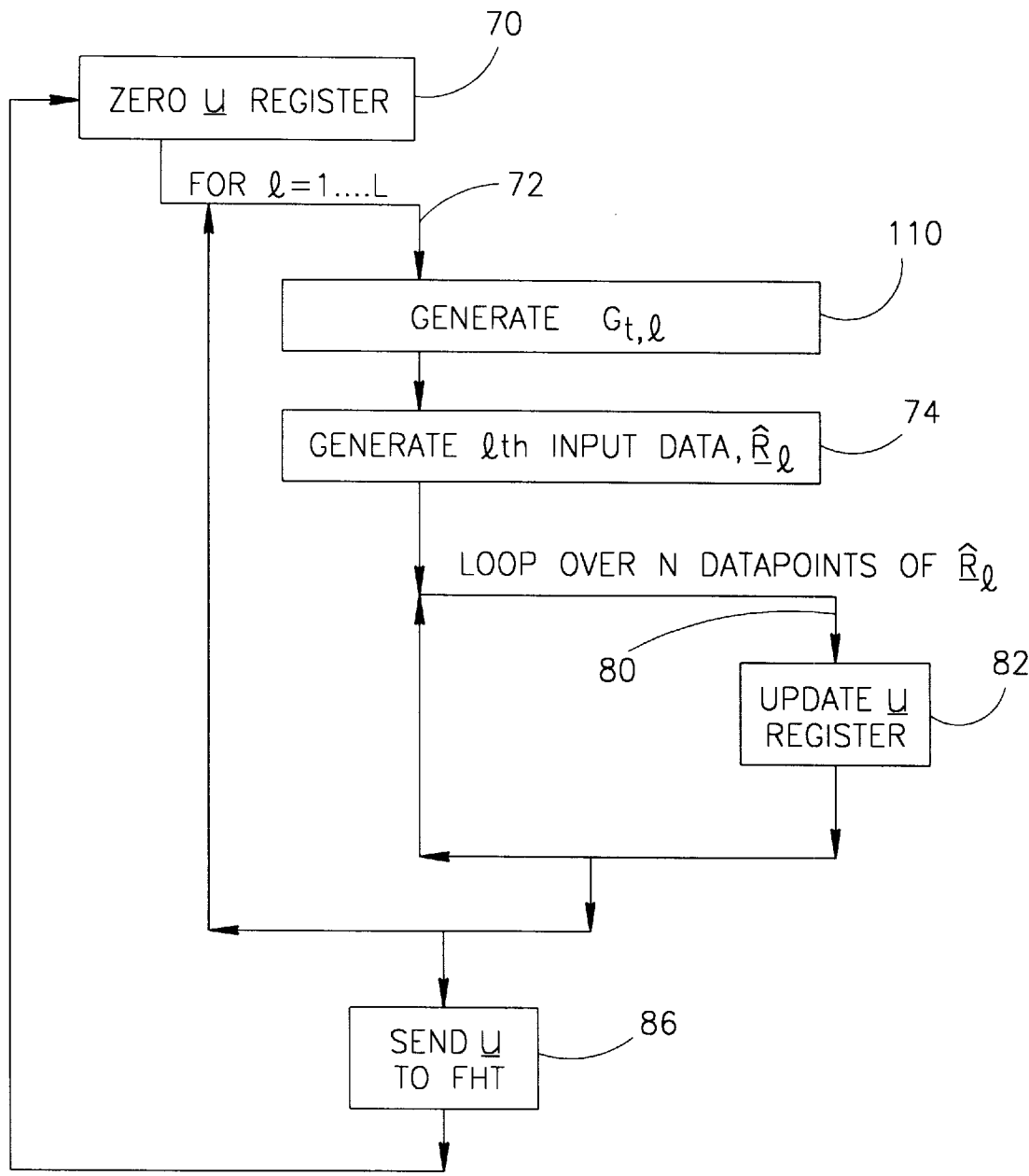
FIG. 8 is a flow chart illustration of a method of operating the pre-Hadamard processor of FIG. 7.

Reference is now made to FIGS. 6, 7 and 8 which illustrate a decoder for messages encoded with error correcting codes which utilizes the concepts of the present invention. For this embodiment, let s be the message and let p[t] be the encoded version of the message s (of length m) which is the sequence to be transmitted. Once again, the received and sampled signal is R[t].

To encode the message s, a generating matrix G, with columns $g_t$, is utilized, where:

$$G = [\, g_1^T \;\cdots\; g_t^T \;\cdots\,]$$

A value $c_t$ is a function of the message s and the t-th generating vector $g_t$ (of length m) and the sequence p[t] is produced from the value $c_t$ as follows:

$$c_t = <s, g_t>$$

$$p[t] = (-1)^{c_t} = (-1)^{<s, g_t>}$$

Thus, the sequence p[t] to be transmitted has the same structure as in the previous embodiments (see Equations 6 and 9) although it is formed from different components.

The metric to be maximized must be insensitive to frequency drift. For BPSK modulation, the metric is:

$$metric[s] = \sum_{t=1}^{N} \hat{R}_l[t] p^l[t]$$

where, as in Appendix D, $$\hat{R}_l[t] = Re\{R[t]R^*[t-l]\} \quad l > 0$$

As in Appendix D, we assume $l \leq m$ and we have $$\hat{R}_l[t] = \alpha^2 Re\{p^0[t](p^0[t-l])^* e^{j\omega_0 l}\} + \eta[t] \approx \alpha^2 Re\{p^0[t](p^0[t-l])^*\} + \eta[t]$$

where $\eta[t]$ denotes the contribution of the noise terms. Now, for BPSK modulation, $$Re\{p^0[t](p^0[t-l])^*\} = p^0[t] p^0[t-l]$$

and $$p^0[t] = (-1)^{<s, g_t>} \quad p^0[t-l] = (-1)^{<s, g_{t-l}>}$$

Thus:

$$p^0[t] p^0[t-l] = (-1)^{<s, g_t \oplus g_{t-l}>}$$

FIG. 6 illustrates the decoder of the present invention for data encoded with error correcting codes. It has a similar structure to that of the pilot acquisition unit and thus, similar elements carry similar reference numerals.

The decoder comprises FHT unit 20, a pre-Hadamard processor, labeled 90, partial, possible $s^E$ generator 24, a local message selector 100 operating similarly to local PN loading selector 26 and a global message selector 102 operating similar to global PN loading selector 28.

Similar to that of the pilot acquisition unit of the previous embodiments, pre-Hadamard processor 90 produces the Hadamard input vector u for all of the messages s which have the current partial, possible message $s^E$ in common, given the received data R[t].

FHT unit 20 performs a fast Hadamard transform on the Hadamard input signal u and produces therefrom the vector metrics[s] for all of the messages s which have the current partial, possible message $s^E$ in common. Local message selector 100 selects the message $s_l$ associated with the maximal component of |metrics[s]|. The process is repeated for all partial, possible message $s^E$ and global message selector 102 selects the detected message s from among those messages $s_l$ produced by local message selector with the largest value of |metric[s]|.

FIG. 7 illustrates the pre-Hadamard processor 90 which is similar to pre-Hadamard processor 22 of FIG. 3 in that it comprises Hadamard vector u register 30, summer 32, scalar multiplier 34 and XOR-AND unit 36. However, pre-Hadamard processor 90 comprises storage unit 104, storing the generating vectors of generating matrix G and a XOR unit 106 instead of the local PN generator 19 of pre-Hadamard processor 22. Storage unit 104 and XOR unit 106 together produce the internal and external vectors, labeled $g_{t,l}^I$ and $g_{t,l}^E$ respectively, which the Hadamard vector u register 30 and XOR-AND unit 36 require.

Specifically, XOR unit 106 generates a combination generating vector $g_{t,l}$ from two vectors $g_t$ and $g_{t-l}$ which are stored in the storage unit 104. The latter vector is l vectors away from the former where l is as defined hereinbelow.

As in the previous embodiments, the combination generating vector $g_{t,l}$ is divided into internal and external vectors, $g_{t,l}^I$ and $g_{t,l}^E$ where the internal vector $g_{t,l}^I$ contains Q components of the combination vector $g_{t,l}$ and the external vector $g_{t,l}^E$ contains m-Q components of the combination vector $g_{t,l}$. XOR-AND unit 36 combines the external vector $g_{t,l}^E$ with the partial possible message $s^E$, as described hereinabove in equation 10, and the multiplier 34 combines the result with the shifted received data $\hat{R}_l[t]$, defined hereinabove.

As in the previous embodiments, internal vector $g_{t,l}^I$ is utilized to define an address within register 30. This is indicated by arrow 40 which points to the address, labeled 42. Pre-Hadamard processor 90 removes the value stored in address 42 and provides the value to summer 32.

FIG. 8 illustrates the operations performed by pre-Hadamard processor 90. They are similar to those shown in FIG. 5 except that the operations on a PN generator are replaced with those on the generating matrix G. Specifically, pre-Hadamard processor 90 begins by zeroing (step 70) the Hadamard vector u register 30. Following the preparation of register 30, pre-Hadamard processor 90 begins loop 72 over the possible values of l. For each value of l, pre-Hadamard processor 90 generates (step 74) the l-th input data loading $\hat{R}_l$ and generates (step 110) the combined generation vector $g_{t,l}$ using the current value of l.

Given combined generation vector $g_{t,l}$ pre-Hadamard processor 90 then determines the values of u register 30 in loop 80 as discussed hereinabove and update u register 30.

After both loops 72 and 80 are finished, the vector u stored in register 30 is provided (step 86) to FHT unit 20.

It will be appreciated by persons skilled in the art that the present invention is not limited to what has been particularly shown and described hereinabove. Rather the scope of the present invention is defined only by the claims which follow after the Appendices:

Appendix A

Suppose that all transmitted signals are QPSK modulated, and let the received complex CDMA signal after baseband down-conversion, matched filtering and sampling be denoted by R[t] t= . . . ,−2,−1,0,1,2, . . . . R[t] consists of the following components:

1. Pilot signal that is transmitted by the base-station.

2. User data signals that are transmitted by the base-station.

3. Interference terms including thermal noise and signals transmitted by adjacent base-stations.

For the purpose of acquiring initial synchronization we are only interested in the pilot signal, pilot[t], which may be represented by $$pilot[t] = \sum_{l=1}^{F} \alpha_l p^0[t] e^{j(\omega_0 t + \phi_l)}$$

where $p^0[t]$ is a complex PN sequence composed of an in-phase PN sequence $$p_I^0[t]$$

and a quaternary PN sequence $$(p_Q^0[t], \ p^0[t] = p_I^0[t] + j p_Q^0[t]),$$

$\alpha_l e^{j\phi_l}$ is the complex channel gain of the l-th finger, F denotes the number of fingers, and $\omega_0$ denotes the residual frequency drift after baseband down-conversion. Now, consider only the most significant finger (the one with the largest $\alpha_l$), and denote the contribution of all other fingers, and of the user data signals (component 2 above) and other interferences (component 3 above) by n[t]. Then R[t] is represented by:

$$R[t] = \alpha p^0[t] e^{j(\omega_0 t + \phi)} + n[t] \quad \text{Equation 13}$$

We assume that n[t] is a zero mean white noise term with variance $\sigma^2$.

The problem is how to efficiently obtain the phase of both PN sequences (i.e. the current loading of the PN generators) given some measurement record R[t] t=1,2, . . . . With no frequency drift, the metric for obtaining the in-phase PN loading is:

$$metric = \sum_{t=1}^{N} R[t] p_I[t] \quad \text{Equation 14}$$

To calculate Equation 14 over all possible PN sequences $p_I[t]$, efficiently, we use a block-code soft decoding method, as follows hereinbelow. Let $c_t$ be the output bit produced by the PN generator or linear feedback shift register (LFSR) at time t. Let the LFSR (Fibonacci form) have m cells and transition matrix given by $$M = \begin{bmatrix} h_{m-1} & 1 & 0 & \cdots & 0 \\ h_{m-2} & 0 & 1 & \cdots & 0 \\ \vdots & \vdots & \vdots & \vdots & \vdots \\ h_1 & 0 & \cdots & 0 & 1 \\ 1 & 0 & \cdots & 0 & 0 \end{bmatrix}$$

so that $a^{(t)} = a^{(t-1)} M$, where $$a^{(t)} = (a_0^{(t)} a_1^{(t)} \ldots a_{m-1}^{(t)})$$

is the state of the shift register at time t.

Now let the state of the LFSR at time t=1 be denoted by $s=(s_0, s_1, \ldots, s_{m-1})$. Given the data measurements R[1], R[2], . . . , R[N], we need to obtain s. Note that $$metric(s) = \sum_{t=1}^{N} R[t] p_I[t] = \sum_{t=1}^{N} R[t] (-1)^{c_t}$$

where $c_t = sM^t h^T = sg_t^T \equiv \langle s, g_t \rangle$, $g_t = h(M^t)^T$ and $h = (h_{m-1}, h_{m-2}, \ldots, h_0)$ ($h_0 \equiv 1$). Note that $g_t$ is the state of the Galois form LFSR after t clocks, when initialized by h. The Galois form LFSR has transition matrix $M^T$, i.e. $a^{(t)} = a^{(t-1)} M^T$.

Now, given a vector $y = (y_0, y_1, \ldots, y_{m-1})$, we define $$b(y) \equiv \sum_{j=0}^{m-1} y_j 2^j$$

Hence, $y = b^{-1}\left(\sum_{j=0}^{m-1} y_j 2^j\right)$.

Let $A_j = \{t : b(g_t) = j\}$ and $u_j = \sum_{t \in A_j} R[t]$. Hence, $$metric(s) = \sum_{j=0}^{2^m - 1} (-1)^{\langle s, b^{-1}(j) \rangle} u_j \quad \text{so that}$$

$$(metric(b^{-1}(0)), \ldots, metric(b^{-1}(2^m - 1))) = u \cdot H_m$$

where $H_m$ is the Hadamard matrix, defined by $(H_m)_{i,j} = (-1)^{\langle b^{-1}(i), b^{-1}(j) \rangle}$. A crucial point in the algorithm is that Hm may be calculated efficiently using the following recursion, $$H_m = \begin{pmatrix} H_{m-1} & H_{m-1} \\ H_{m-1} & -H_{m-1} \end{pmatrix}$$

Hence, for any vector u of dimension $2^m$, if u is partitioned to two sub-vectors $u_1$, $u_2$ of dimension $2^{m-1}$ each, i.e. $u = (u_1, u_2)$, we have Equation 15

$$u \cdot H_m = (u_1 H_{m-1} + u_2 H_{m-1}, u_1 H_{m-1} - u_2 H_{m-1})$$

That is to say, the Hadamard transform (HT) of u may be obtained from the HT-s of $u_1$, $u_2$. Furthermore, Equation 15 can be recursively invoked on each of the smaller dimensional HT-s to produce the Fast Hadamard transform (FHT) algorithm.

The system may be improved in terms of both computational time and memory requirements as follows. Let $g_t$ and s be partitioned as follows $$g_t = (g_t^I \ g_t^E) \quad s = (s^I \ s_E)$$

where $g_t^I$ and $s^I$ have dimension Q, and where $g_t^E$ and $s^E$ have dimension m-Q (I denotes internal space, and E denotes external space). Hence, $$metric(s) = \sum_{t=1}^{N} (-1)^{\langle s^I, g_t^I \rangle} (-1)^{\langle s^E, g_t^E \rangle} R[t]$$

Let, $$A_j = \{t : b(g_t^I) = j\} \quad j = 0, 1, \ldots, 2^Q - 1$$

$$i = b(s^E) \quad \text{and}$$

-continued $$u_j^{(i)} = \sum_{t \in A_j} (-1)^{\langle s^E, g_t^E \rangle} R[t] \qquad \text{Equation 16}$$

Then, $$\text{metric}(s) = \sum_{j=0}^{2^Q-1} (-1)^{\langle s^I, b^{-1}(j) \rangle} u_j^{(i)}$$

To calculate metric(s) efficiently we enumerate over all possible values of $s^E$. For each value of $s^E$, we first calculate $u_j^{(i)}$ j=0,1, . . . ,$2^Q$−1 using Equation 16, and then apply the fast Hadamard transform. The estimated loading of the PN is that value of s=($s^I$ $s^E$) that maximizes $\|\text{metric}(s)\|^2$.

Appendix B

In most transmission systems, the received samples are subject to an unknown frequency drift (i.e., $\omega_0$ is non-zero). For this case, the suggested metric is $$\text{metric}(s) = \sum_{t=1}^{N} \hat{R}_l[t] p_l^t[t] \qquad \text{Equation 17}$$

where $$\hat{R}_l[t] = \text{Re}\{R[t]R^*[t-l]\} \quad l>0$$

For simplicity we assume 1≦m. Recall Equation 3, we have $$\hat{R}_l[t] = a^2 \text{Re}\{p^0[t](p^0[t-l])^* e^{j\omega_0 l}\} + \eta[t] \approx a^2 \text{Re}\{p^0[t](p^0[t-l])^*\} + \eta[t]$$

where $\eta[t]$ denotes the contribution of the noise terms. The approximation is due to the fact that the frequency drift is typically such that, for small l, $\omega_0 l \ll 1$. Now, $$\text{Re}\{p^0[t](p^0[t-l])^*\} = p_I^0[t]p_I^0[t-l] + p_Q^0[t]p_Q^0[t-l]$$

In addition, $$p_I^0[t] = (-1)^{sM^t h^T} p_I^0[t-l] = (-1)^{sM^t z_l^T}$$

where $$z_l = \left( \underbrace{0 \ldots 0}_{l-1} \; 1 \; \underbrace{0 \ldots 0}_{m-l} \right) \qquad \text{Equation 18}$$

Let $h_l = h \ominus z_l$. Then $p_I^0[t]p_I^0[t-l] = (-1)^{sM^t h_l^T}$. The metric is maximized for $p_I^t[t] = (-1)^{sM^t h_l^T}$. Hence, the algorithm that was presented in Appendix A may be applied to $\hat{R}_l[t]$, except that the initial loading to the PN is $h_l$ instead of h. We call this algorithm, the differential algorithm. We now suggest a multi-differential algorithm, which is an extension of the differential algorithm and is described in the text hereinabove with respect to FIG. 5. The suggested metric is $$\text{metric}(s) = \sum_{l=1}^{L} \sum_{t=1}^{N} \hat{R}_l[t] p_l^t[t] \qquad \text{Equation 19}$$

The metric is optimized for $p_l^t[t] = (-1)^{sM^t h_l^T}$.

Denote $g_{t,l} = h_l(M^T)^t$. Then $$\text{metric}(s) = \sum_{l=1}^{L} \sum_{t=1}^{N} \hat{R}_l[t] (-1)^{\langle s, g_{t,l} \rangle}$$

We proceed by using an algorithm, which is similar to the one that we used in the previous case (no frequency drift). Let $g_{t,l}$ and s be partitioned as follows $$g_{t,l} = (g_{t,l}^I g_{t,l}^E) \quad s = (s^I \; s^E)$$

where $g_{t,l}^I$ and $s^I$ have dimension Q, and where $g_{t,l}^E$ and $s^E$ have dimension m−Q (I denotes internal space, and E denotes external space). Hence, $$\text{metric}(s) = \sum_{l=1}^{L} \sum_{t=1}^{N} (-1)^{\langle s^I, g_{t,l}^I \rangle} (-1)^{\langle s^E, g_{t,l}^E \rangle} R[t]$$

Let, $$A_j = \{t : b(g_{t,l}^I) = j\} \quad j = 0,1, \ldots, 2^Q - 1$$

$$i = b(s^E)$$

and $$u_j^{(i)} = \sum_{l=1}^{L} \sum_{t \in A_j} (-1)^{\langle s^E, g_{t,l}^E \rangle} R[t] \qquad \text{Equation 20}$$

Then, $$\text{metric}(s) = \sum_{j=0}^{2^Q-1} (-1)^{\langle s^I, b^{-1}(j) \rangle} u_j^{(i)}$$

To calculate metric(s) efficiently we enumerate over all possible values of $s^E$. For each value of $s^E$, we first calculate $$u_j^{(i)}$$

j=0,1, . . . ,$2^Q$−1 using Equation 21, and then apply the fast Hadamard transform. The estimated loading of the PN is that value of s=($s^I s^E$) that maximizes $\|\text{metric}(s)\|^2$. Basically, FIG. 3 describes the algorithm, except that to create $$\{u_j^{(i)}\}$$

the PN generator 10 needs to be reloaded and advanced L times (L<m), in order to create L sequences:

$$g_{t,l} \; t=1,2, \ldots, N$$

for l=1,2, . . . L. The fast Hadamard transform routine needs to be applied only once, per each value of $s^E$. The benefit of the multi-differential (over the differential) system is that a smaller amount of data is required.

APPENDIX C

BPSK modulation utilizes a single binary sequence which results in a different metric. However, the derivation is similar, as will be discussed hereinbelow.

Without frequency drift, the pilot signal has the form (provided in the Background as Equation 2):

$$pilot[t] = \sum_{l=1}^{F} \alpha_l p^0[t] e^{j(\omega_0 t + \phi_l)} \qquad \text{Equation 21}$$

As before, consider only the most significant finger and denote the contribution of all other fingers, the user data signals and other interferences by n[t]. Then R[t] is represented by Equation 3 (repeated here):

$$R[t] = \alpha p^0[t] e^{j(\omega_0 t + \phi)} + n[t] \qquad \text{Equation 22}$$

For BPSK modulation, p[t] and $p^0[t]$ are reals and not complex and thus, the metric is provided in Equation 4 (repeated here):

$$metric = \sum_{t=1}^{N} R[t]p(t) \qquad \text{Equation 23}$$

The rest of the derivation is identical to that provided in Appendix A (after Equation 14) where, for this embodiment, $p_i[t]$ of Appendix A is replaced by p[t].

APPENDIX D

For BPSK modulation with frequency drift, the metric is similar to that of Equation 19, as follows:

$$metric(s) = \sum_{t=1}^{N} \hat{R}_l[t] p^l[t]$$

where, as in Appendix B, $$\hat{R}_l[t] = \text{Re}\{R[t]R^*[t-1]\} \quad l>0$$

As in Appendix B, we assume $1 \le m$ and we have $$\hat{R}_l[t] = a^2 \text{Re}\{p^0[t](p^0[t-1])^* e^{j\omega 0 l}\} + \eta[t] = a^2 \text{Re}\{p^0[t](p^0[t-1])^*\} + \eta[t]$$

where η[t] denotes the contribution of the noise terms, Now, for BPSK modulation, $$\text{Re}\{p^0[t](p^0[t-1])^*\} = p^0[t]p^0[t-1]$$

and $$p^0[t] = (-1)^{sM^t h^T} p^0[t-1] = (-1)^{sM^t z_l T}$$

where $z_l$ is defined by Equation 18. The metric is maximized for $$p^l[t] = (-1)^{sM^t h_l^T}$$

The rest of the derivation is identical to that provided in Appendix A (after Equation 18) where, for this embodiment, $p_i[t]$ of Appendix B is replaced by p[t].

What is claimed is:

1. A pilot acquisition unit for a code division multiple access (CDMA) communication system, the pilot acquisition unit comprising:
   a. a fast Hadamard transform (FHT) unit for determining the quality, in accordance with a metric, of each of a set of possible pseudo-random number (PN) loadings; and
   b. a pre-Hadamard processing unit for generating a vector u per set of PN loadings, said vector u defining a quality metric of a received pilot signal with said set of possible PN loadings, said pre-Hadamard processing unit providing said vector u to said FHT unit.

2. A pilot acquisition unit according to claim 1 and wherein said pre-Hadamard processing unit comprises a local PN generator.

3. A pilot acquisition unit according to claim 2 and also comprising a partial possible PN loading generator for generating a series of partial possible PN loadings $s^E$, wherein each partial possible PN loading $s^E$ defines one said set of possible PN loadings.

4. A pilot acquisition unit according to claim 1 and also comprising a local PN loading selector for selecting the PN loading for which said FHT produces the best metric.

5. A pilot acquisition unit according to claim 4 and also comprising a global PN loading selector for selecting the PN loading having the best metric from among the PN loadings selected by said local PN loading selector.

6. A pilot acquisition unit according to claim 4 and also comprising a dual dwell unit for selecting the PN loadings having the metric values above a predetermined threshold from among the PN loadings selected by said local PN loading selector, for determining a second metric for each of said selected PN loadings and for selecting the PN loading from among the selected PN loadings with the best value for said second metric.

7. A pilot acquisition unit according to claim 3 and wherein said pre-Hadamard processing unit comprises u vector generating means including:
   a. initializing means for loading said local PN generator with an initial PN loading; and
   b. loop means operating on each of the datapoints of said received pilot signal, said loop means including:
      i) combination means for combining one partial possible loading $s^E$ with a datapoint of said received pilot signal and with a PN loading produced by said local PN generator thereby to update said u vector; and
      ii) PN stepping means for stepping said local PN generator.

8. A pilot acquisition unit according to claim 3 wherein said received pilot signal has a frequency drift therein and wherein said pre-Hadamard processing unit comprises u vector generating means including:
   a. drift loop means operating on a plurality of loop values for loading said local PN generator with a different initial PN loading per loop value and for generating an input signal from said received pilot signal which is insensitive to drift; and
   b. datapoint loop means operating on each of the datapoints of said input signal, said loop means including:
      i) combination means for combining one partial possible loading $s^E$ with a datapoint of said received pilot signal and with a PN loading produced by said local PN generator thereby to update said u vector; and
      ii) PN stepping means for stepping said local PN generator.

9. A code synchronization unit for synchronizing to received encoded signals having frequency drift therein, the code synchronization unit comprising:
   a. a fast Hadamard transform (FHT) unit for determining the quality, in accordance with a metric, of each of a set of possible pseudo-random number (PN) loadings; and
   b. a pre-Hadamard processing unit for generating a vector u per set of possible PN loadings, said vector u defining a quality metric of said received encoded signal with said set of possible PN loadings, said pre-Hadamard processing unit providing said vector u to said FHT unit.

10. A code synchronization unit according to claim 9 and wherein said pre-Hadamard processing unit comprises a local PN generator.

11. A code synchronization unit according to claim 10 and also comprising a partial possible PN loading generator for generating a series of partial possible PN loadings $s^E$, wherein each partial possible PN loading $s^E$ defines one said set of possible PN loadings.

12. A code synchronization unit according to any of claims 10–11 and also comprising a local PN loading selector for selecting the PN loading for which said FHT produces the best metric.

13. A code synchronization unit according to claim 12 and also comprising a global PN loading selector for selecting the PN loading having the best metric from among the PN loadings selected by said local PN loading selector.

14. A code synchronization unit according to claim 12 and also comprising a dual dwell unit for selecting the PN loadings having the metric values above a predetermined threshold from among the PN loadings selected by said local PN loading selector, for determining a second metric for each of said selected PN loadings and for selecting the PN loading from among the selected PN loadings with the best value for said second metric.

15. A code synchronization unit according to claim 11 wherein said pre-Hadamard processing unit comprises u vector generating means including:
   a. drift loop means operating on a plurality of loop values for loading said local PN generator with a different initial PN loading per loop value and for generating an input signal from said received pilot signal which is insensitive to drift; and
   b. datapoint loop means operating on each of the datapoints of said input signal, said loop means including:
      i) combination means for combining one partial possible loading $s^E$ with a datapoint of said received pilot signal and with a PN loading produced by said local PN generator thereby to update said u vector; and
      ii) PN stepping means for stepping said local PN generator.

16. An error correcting code decoder for decoding signals having frequency drift therein, the decoder comprising:
   a. a fast Hadamard transform (FHT) unit for determining the quality, in accordance with a metric, of each of a set of possible messages; and
   b. a pre-Hadamard processing unit for generating a vector u per set of possible PN loadings, said vector u defining a quality metric of said received encoded signal with said set of possible messages, said pre-Hadamard processing unit providing said vector u to said FHT unit.

17. A decoder according to claim 16 and also comprising a partial possible message generator for generating a series of partial possible messages $s^E$, wherein each partial possible message $s^E$ defines one said set of possible messages.

18. A decoder according to claim 16 and also comprising a local message selector for selecting the message for which said FHT produces the best metric.

19. A decoder according to claim 18 and also comprising a global message selector for selecting the message having the best metric from among the messages selected by said local message selector.

20. A decoder according to claim 18 and also comprising a dual dwell unit for selecting the messages having the metric values above a predetermined threshold from among the messages selected by said local message selector, for determining a second metric for each of said selected messages and for selecting the message from among the selected messages with the best value for said second metric.

21. A decoder according to claim 16 wherein said pre-Hadamard processing unit comprises u vector generating means including:
   a. drift loop means operating on a plurality of loop values l for creating a combined generating vector formed from two generating vectors a distance l apart; and
   b. datapoint loop means operating on each of the datapoints of said input signal for combining one partial possible message $s^E$ with a datapoint of said input signal and with an external portion of said combined generating vector thereby to update an element of said u vector defined by an internal portion of said combined generating vector.

22. A method for synchronizing to pilot signals of a code division multiple access (CDMA) communication system, the method comprising the steps of:
   a. per a set of possible PN loadings:
      i) loading a local PN generator with an initial PN loading;
      ii) looping on each of the datapoints of said received pilot signal, said step of looping including the steps of:
         a) combining one partial possible loading $s^E$ with a datapoint of said received pilot signal and with a PN loading produced by said local PN generator thereby to update a u vector; and
         b) stepping said local PN generator to produce another PN loading;
      iii) performing a fast Hadamard transform on said u vector to determine the quality, in accordance with a metric, of each of said set of possible PN loadings;
      iv) selecting the PN loading having the best value for its metric;
   b. repeating steps i–iv for all sets of PN loadings; and
   c. selecting the PN loading with the best metric from among the PN loadings selected in step iv.

23. A method for synchronizing to pilot signals of a code division multiple access (CDMA) communication system which have frequency drift therein, the method comprising the steps of:
   a. per a set of possible PN loadings:
      i) looping over plurality of drift loop values, the step of looping including the steps of:
         a) loading a local PN generator with a different initial PN loading per loop value; and
         b) generating an input signal from a received pilot signal which is insensitive to drift;
      ii) looping on each of the datapoints of said input signal, said second step of looping including the steps of:
         a) combining one partial possible loading $s^E$ with a datapoint of said input signal and with a PN loading produced by said local PN generator thereby to update a u vector; and
         b) stepping said local PN generator to produce another PN loading;
      iii) performing a fast Hadamard transform on said u vector to determine the quality, in accordance with a metric, of each of said set of possible PN loadings;

iv) selecting the PN loading having the best value for its metric;

b. repeating steps i–iv for all sets of PN loadings; and c. selecting the PN loading with the best metric from among the PN loadings selected in step iv.

24. A method for synchronizing to received encoded signals having frequency drift therein, the method comprising the steps of:

a. per a set of possible PN loadings:
  i) looping over plurality of drift loop values, the step of looping including the steps of:
    a) loading a local PN generator with a different initial PN loading per loop value; and
    b) generating an input signal from a received pilot signal which is insensitive to drift;
  ii) looping on each of the datapoints of said input signal, said second step of looping including the steps of:
    a) combining one partial possible loading $s^E$ with a datapoint of said input signal and with a PN loading produced by said local PN generator thereby to update a u vector; and
    b) stepping said local PN generator to produce another PN loading;
  iii) performing a fast Hadamard transform on said u vector to determine the quality, in accordance with a metric, of each of said set of possible PN loadings;
  iv) selecting the PN loading having the best value for its metric;

b. repeating steps i–iv for all sets of PN loadings; and c. selecting the PN loading with the best metric from among the PN loadings selected in step iv.

25. A method for decoding signals having messages therein and being encoded with error correcting codes, the signals having frequency drift therein, the method comprising the steps of:

a. per a set of possible messages:
  i) looping over plurality of drift loop values l, the step of looping including the steps of:
    a) creating a combined generating vector formed from two generating vectors a distance l apart; and
    b) generating an input signal from a received pilot signal which is insensitive to drift;
  ii) looping on each of the datapoints of said input signal, said second step of looping including the step of:
    a) combining one partial possible message $s^E$ with a datapoint of said input signal and with an external portion of said combined generating vector thereby to update an element of said u vector defined by an internal portion of said combined generating vector;
  iii) performing a fast Hadamard transform on said u vector to determine the quality, in accordance with a metric, of each of said set of possible messages;
  iv) selecting the message having the best value for its metric;

b. repeating steps i–iv for all sets of messages; and c. selecting the message with the best metric from among the messages selected in step iv.

* * * * *